Figure 4:
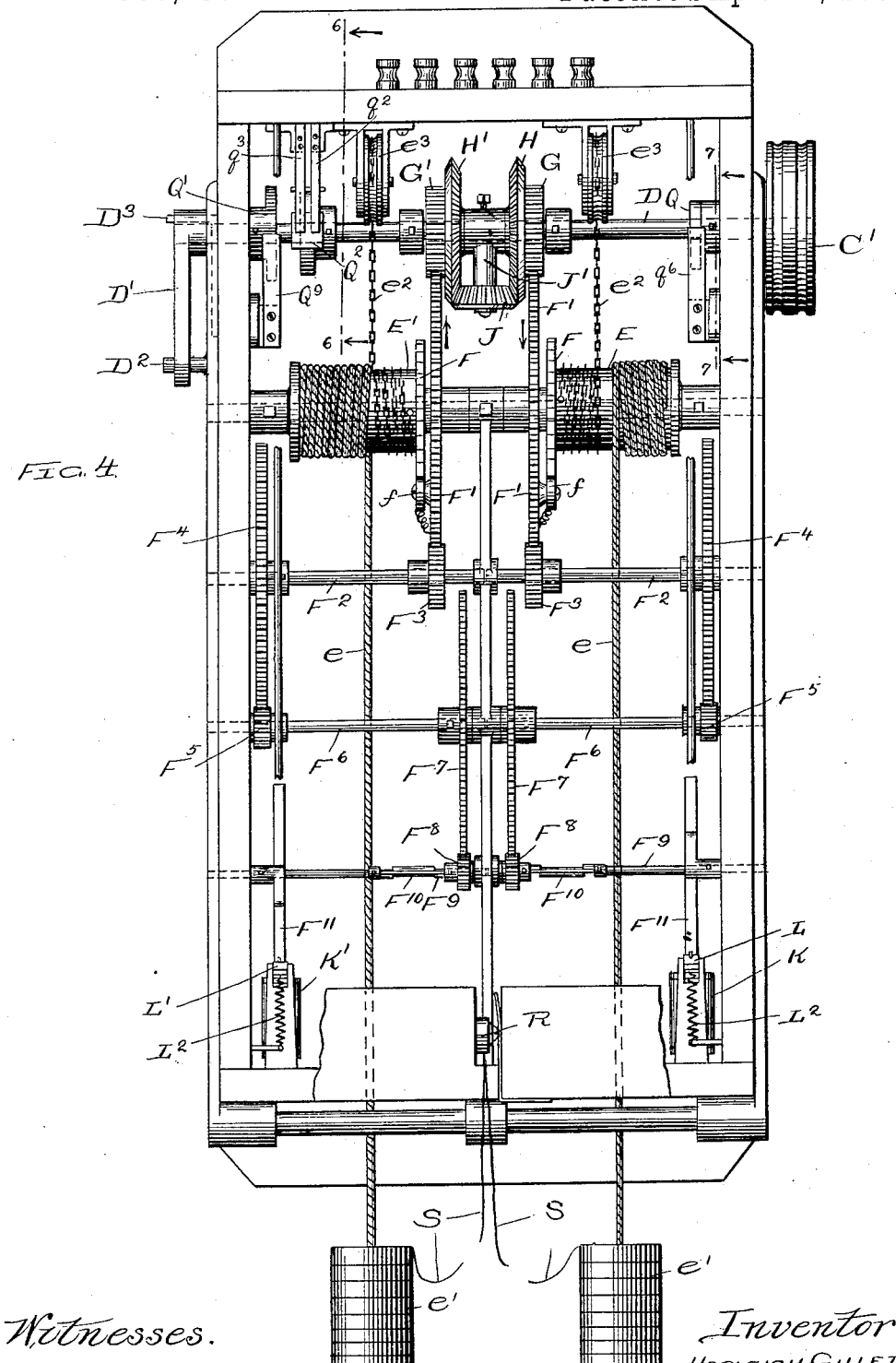

(No Model.) 4 Sheets—Sheet 1.
H. GILLETTE.
TEMPERATURE REGULATOR.
No. 558,453. Patented Apr. 14, 1896.
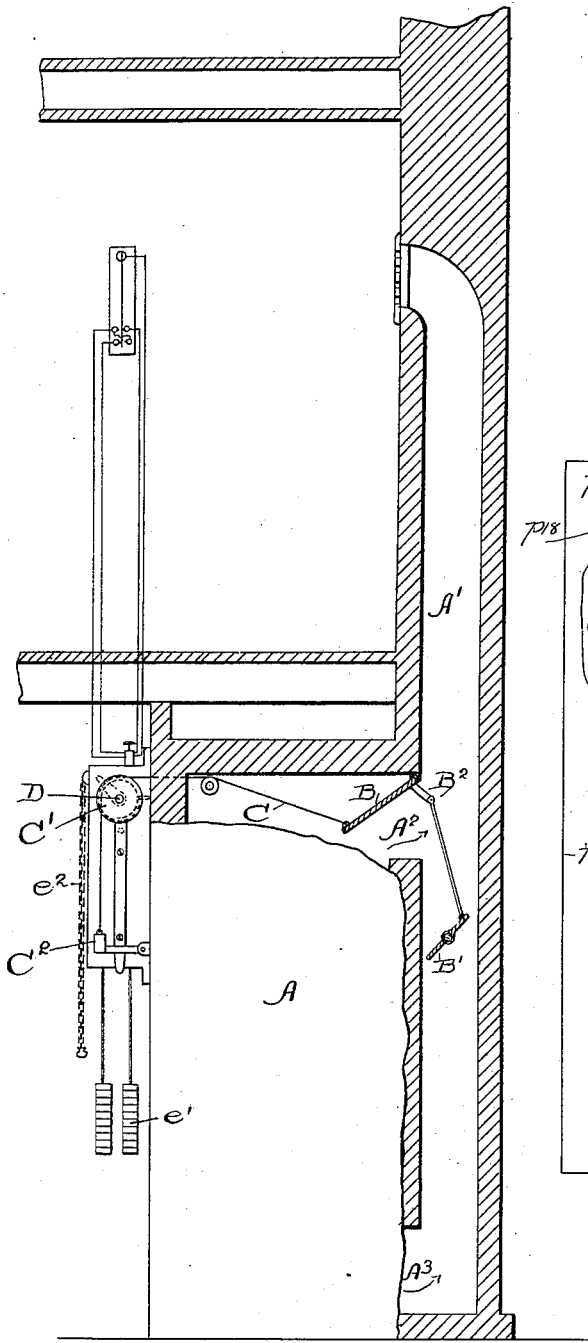
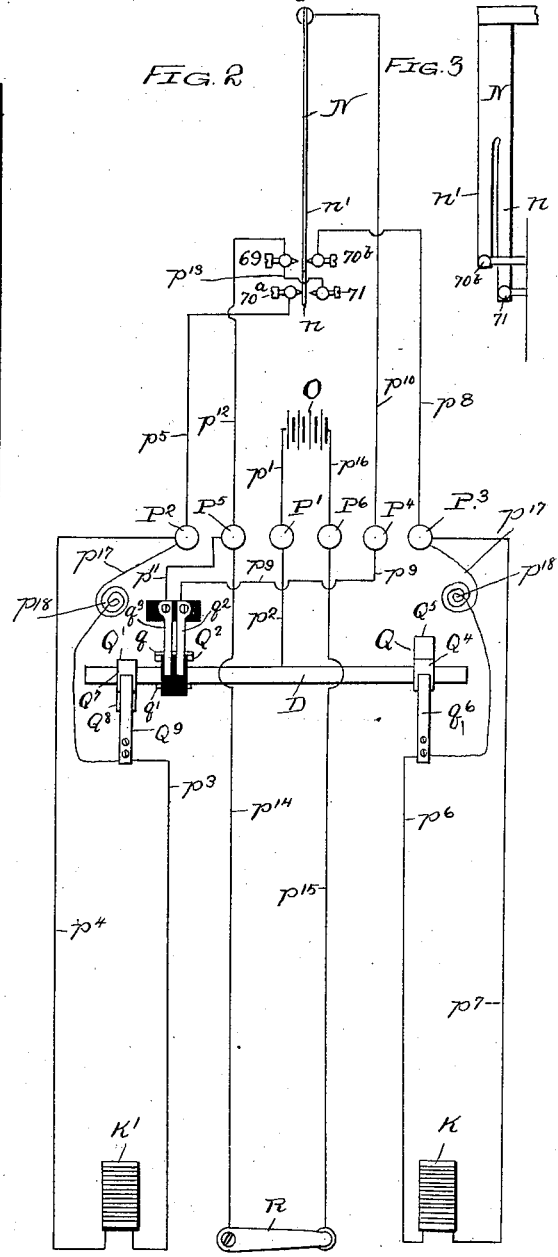
Witnesses.
Inventor
HARLEIGH GILLETTE
by Munday, Evarts & Adcock,
His Atty's (No Model.) 4 Sheets—Sheet 2.

H. GILLETTE.
TEMPERATURE REGULATOR.

No. 558,453. Patented Apr. 14, 1896.

Witnesses.
Wm. M. Rheem
H. W. Munday

Inventor
Harleigh Gillette
by Munday, Evarts & Adcock
his Att'ys (No Model.) 4 Sheets—Sheet 3.
H. GILLETTE.
TEMPERATURE REGULATOR.
No. 558,453. Patented Apr. 14, 1896.
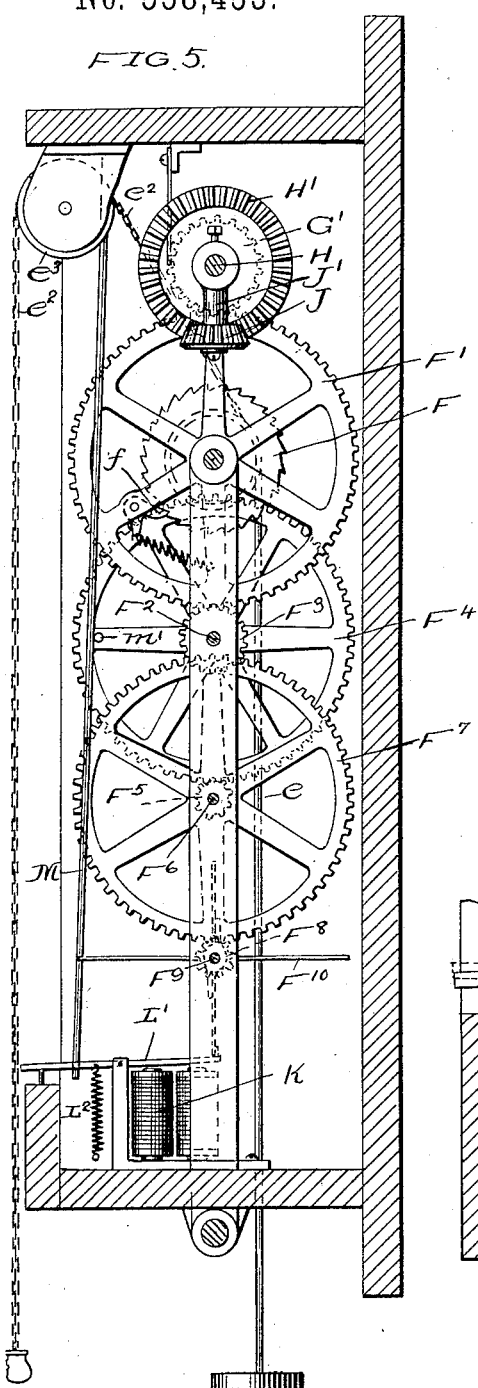
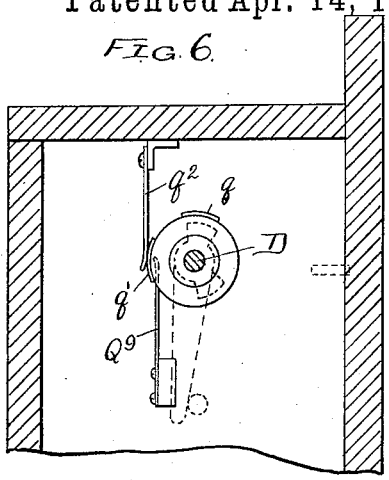
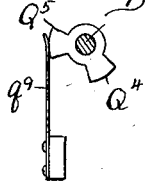
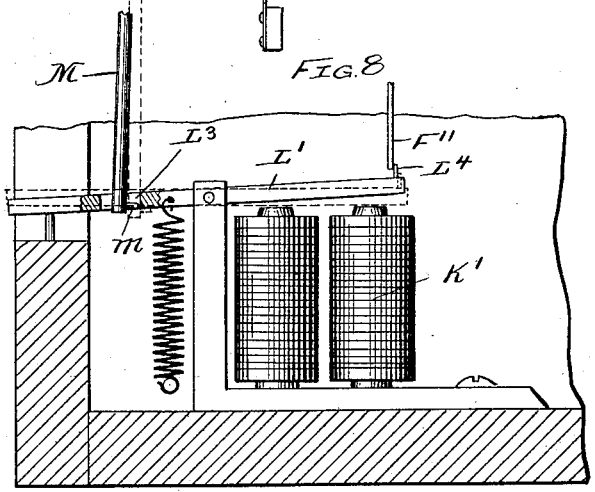
Witnesses
Inventor
HARLEIGH GILLETTE
by Munday, Evarts & Adcock
His Atty's (No Model.) 4 Sheets—Sheet 4.
H. GILLETTE.
TEMPERATURE REGULATOR.
No. 558,453. Patented Apr. 14, 1896.
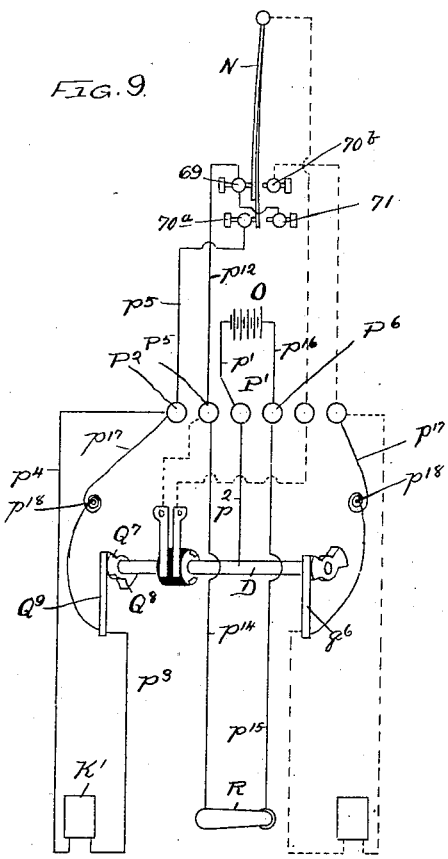
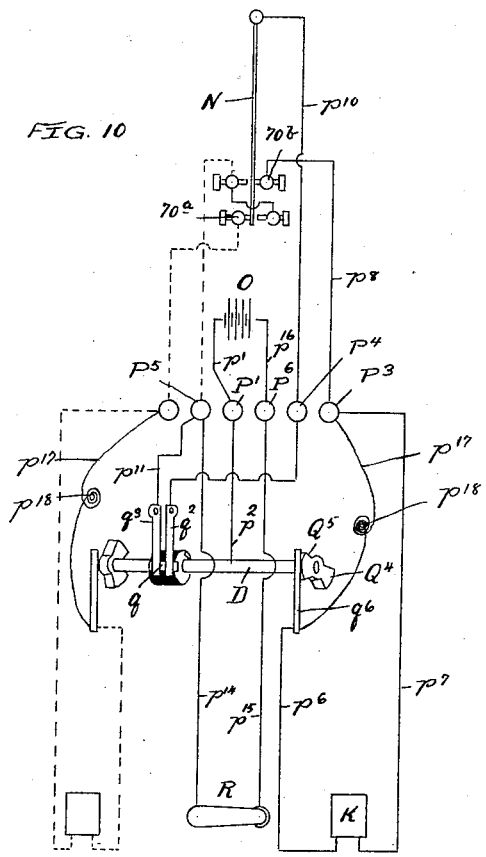
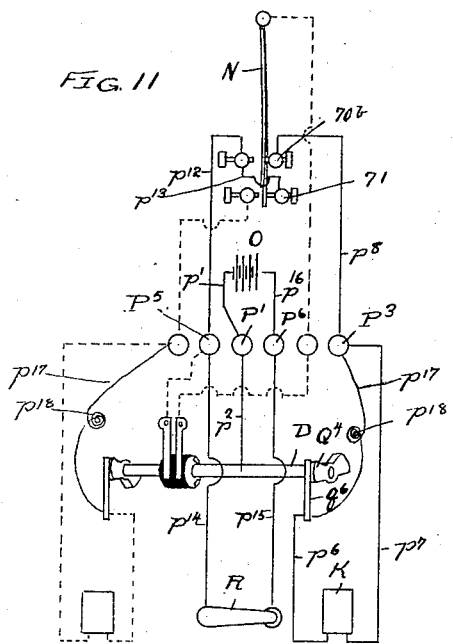
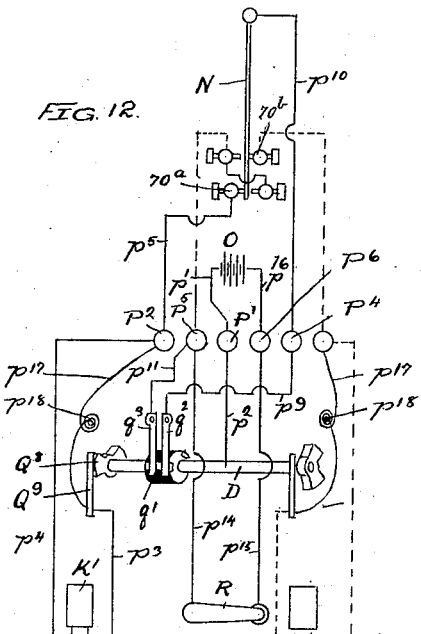
WITNESSES:
INVENTOR:
HARLEIGH GILLETTE
BY Munday, Warts & Adcock.
HIS ATTYS

UNITED STATES PATENT OFFICE.

HARLEIGH GILLETTE, OF HIGHLAND PARK, ILLINOIS, ASSIGNOR, BY MESNE ASSIGNMENTS, TO A. J. RODGERS, OF CHICAGO, ILLINOIS.

TEMPERATURE-REGULATOR.

SPECIFICATION forming part of Letters Patent No. 558,453, dated April 14, 1896.

Application filed July 19, 1895. Serial No. 556,443. (No model.)

*To all whom it may concern:*

Be it known that I, HARLEIGH GILLETTE, a citizen of the United States, residing in Highland Park, in the county of Lake and State of Illinois, have invented a new and useful Improvement in Temperature-Regulators, of which the following is a specification.

This invention relates to an improvement in thermostatic regulators for furnaces, the purpose being to regulate the heat by opening and closing the dampers by means of clockwork governed by electric circuits controlled by the thermostat.

The nature of the invention will be understood from the subjoined specification and claims and the accompanying drawings, which form a part of this specification, and in which similar letters and figures of reference indicate like parts in all the views.

In said drawings, Figure 1 is a general view showing a section of a building, its flues, the thermostat, the clockwork mechanism, and the dampers. Fig. 2 is a diagram of the electric circuits. Fig. 3 is a side view of the thermostatic blade shown in Fig. 2. Fig. 4 is a front view of the clockwork mechanism. Fig. 5 is a general sectional view of the same. Fig. 6 is a partial section on the line 6 6 of Fig. 4. Fig. 7 is a sectional view on the line 7 7 of Fig. 4. Fig. 8 is an enlarged view, partly in section, of a portion of Fig. 5. Figs. 9, 10, 11, and 12 are diagrams similar to Fig. 2, showing the circuit in different conditions.

Where buildings are heated by hot air from a furnace, apparatus has sometimes been employed for controlling or regulating the heat, said apparatus being controlled by means of a thermostat placed in the room to be heated and electrically connected with such apparatus in such manner that when the heat in the room rises above a certain point—for example, 70° Fahrenheit—the thermostat, by closing an electric circuit, will cause the supply of hot air to the room to be entirely shut off and simultaneously a supply of cold air to be fully turned on; and then when the temperature in the room rises or falls below 70° the thermostat is affected thereby and caused to make an electric contact on the other side, controlling a circuit which sets the apparatus in operation and causes the hot-air supply to be fully turned on and the cold-air supply to be entirely shut off, and so on as the the temperature varies in the room. An objection to this kind of apparatus consists in the fact that the temperature in the room is not maintained equally through any period of time. The thermostat may be sensitive enough to indicate a very small change in temperature, and to thus control the complete opening or complete closing of the valve or valves; but as the supply of hot air is thus fully turned on all at once and the supply of cold air completely turned off, or vice versa, the result is that the temperature in the room is constantly made to rise and fall alternately through a considerable number of degrees by alternating puffs or blasts, so to speak, of very hot and very cold air, and this condition is brought about by the very means which are employed to regulate the temperature.

It is the prime purpose of the present invention to obviate this difficulty by so contriving the thermostat and the apparatus for automatically operating the valves that said valves shall have three positions instead of two—that is to say, the thermostat and mechanism for operating the valves are so constructed, arranged, and combined that when the temperature in the room is at the point desired, say 70°, the hot-air valve will be half-way open and the cold-air valve also half-way open. If the temperature falls below 70°, say to 68°, the cold-air valve will be moved from the half-way position and fully closed, and the hot-air valve moved from the half-way position and fully opened. If the temperature now rises in the room to 70°, the cold-air valve will be brought back to the half-open position, and the hot-air valve returned also to the half-way-open position. If again the temperature in the room should now rise above 70°, say to 72°, the hot-air valve is moved thereby from the half-way position to the fully-closed position, and the cold-air valve from the half-way position to the fully-opened position, and so on as the temperature changes, the movement of the valves being always a half movement instead of a full movement. By this feature it will be readily understood that the margin of variation produced by the action of the thermostat and valve operation is much smaller, the variations being theoretically one-half, but practically so small as to be imperceptible to the occupants of the room.

In the construction of the flues of such heating-furnaces as are here spoken of it is customary to have the cold-air duct and the hot-air duct or flue join into a common delivery-flue. Sometimes a single valve-leaf is employed for both the hot air and the cold air, said valve-leaf or damper being hinged at one edge in such manner that when it is lifted up to open the cold-air flue it by that act closes the hot-air flue, and when lowered to close the cold-air flue it by that act operates to open the hot-air flue. Sometimes, however, two separately-hinged valves connected together are employed. These forms are of course equivalents for each other, though there is a slight advantage in the employment of two separate valves connected together.

In the accompanying drawings, referring to Fig. 1, A is the position or chamber in which is located the hot-air furnace, the furnace not being shown in the drawings, as the same may consist of any of the well-known forms of hot-air furnace.

$A'$ is the flue or pipe for conveying the air to the room to be heated. $A^2$ is the opening for the admission of hot air to this room, and $A^3$ the opening for the admission of cold air.

B is the hot-air damper, and $B'$ the cold-air damper. These dampers or valves are suitably pivoted or hinged in their respective passage-ways, and are shown connected together by the connection $B^2$ in such manner that when the hot-air damper is fully closed the cold-air damper will be fully open, and when the hot-air damper is fully open the cold-air damper will be fully closed, and when the hot air is half-way open, which may for convenience of description be regarded as the normal condition, the cold-air damper will in like manner be half-way open.

The hot-air damper B is connected by a cord C to the pulley $C'$, the cord C being wound around said pulley and its outer end provided with a weight $C^2$, the arrangement being such, as will be understood from the drawings at Fig. 1, that when the pulley is rotated for a partial revolution in one direction the hot-air damper will be opened, a partial revolution in the opposite direction will bring the hot-air damper to its normal or half-open position, and a partial further revolution in the same direction will fully close the hot-air damper, and so on, and the cold-air damper being connected, as above stated, it is operated by the same movement, closing as the hot-air damper opens and opening as the hot-air damper closes.

The pulley $C'$ is connected to a clockwork mechanism, being mounted upon a shaft D, which is connected with the clockwork. This clockwork, which has for its purpose to turn the pulley $C'$ in a certain manner, will now be described: It is a double or duplicate clockwork consisting of two trains, each driven by a separate weight from separate drums wound to turn in opposite directions. These drums are shown at $E E'$, and they are mounted to turn loosely on the shaft or shafts which support them. The two weight-cords, one for each of the drums, are shown at $e e$ and the weights at $e' e'$. Winding-chains $e^2 e^2$, one for each of the drums and wound oppositely to the cord, pass up over pulleys $e^3 e^3$ in the usual manner of such winding-chains to afford a convenient means for winding up the two trains. Each of the drums has a ratchet F fixed rigidly to the drum, which ratchet is engaged by a spring-pawl $f$, mounted on the gear-wheels $F' F'$, one for each drum. These gear-wheels $F'$ are loose on the shafts which support the drums. Two counter-shafts $F^2 F^2$ not connected to each other, though standing end to end in line, are each provided with a pinion $F^3$ and a gear-wheel $F^4$. The pinion $F^3$ in each case is engaged by the gear $F'$, and the gear $F^4$ in each case engages a pinion $F^5$, one on each of the shafts $F^6$. Each of these shafts $F^6$ carries a gear $F^7$, which gears each engage a pinion $F^8$ on the shafts $F^9$, which are the final or most rapid shafts of the two trains. On each of these final shafts $F^9$ is mounted a fly-blade $F^{10}$ to prevent too rapid discharge of the power, and each carries also a stop-arm $F^{11}$. The function of the gearing $F^3 F^4 F^5 F^7 F^8$ in the two separate trains is to multiply the speed from the drums $E E'$ to the final shafts $F^9$, and to correspondingly diminish the power, so that the flies $F^{10} F^{10}$ may serve to regulate the movement, and also so that a quick-acting stop, requiring little power to operate it, may be provided for stopping either one of the trains—viz., the stop-arm $F^{11}$.

Returning now to the two main gears $F' F'$, it will be found that these gears mesh, respectively, with pinions G and $G'$, mounted loosely on the shaft D, which is the shaft that carries the pulley $C'$ heretofore mentioned. Connected rigidly to the pinion G is a bevel-wheel H, and connected in like manner to the pinion $G'$ is a bevel-wheel $H'$. Between these bevel-wheels H and $H'$ is mounted a loose bevel-wheel J, carried on an arm $J'$, which is rigidly fixed to the shaft D. Since one of the gears H $H'$ is at rest when the other is in motion, the arm $J'$ will be caused to move in an arc either in one direction or the other, depending upon which of the two gears is the one in motion, the direction of the motion being the same as that of the moving gear, and since the arm $J'$ is rigidly attached to the shaft D this shaft will be turned by it in the same direction and through the same arc, and this motion communicated to the pulley $C'$.

There have now been described two independent and separate trains of clockwork, both connected to the shaft D in such manner that when both said trains are stopped by the stop-arms $F^{11} F^{11}$ the shaft D and pulley C' will be held immovable, and when one of the trains is stopped and the other released the shaft D and pulley C' will be moved in one direction, and when the other train which was formerly stopped is released and the one which was released is stopped, then the shaft D and the pulley C' will be rotated in the opposite direction. From this it will be understood that the rotation of the shaft D may be controlled by manipulating the stop-arms $F^{11}$, as follows: Said shaft may be stopped still by stopping both arms $F^{11}$. It may be rotated in either direction by releasing one or the other of said arms.

K K' are two electromagnets, one for each of the trains. L L' are the armatures of the same, each having a retracting-spring $L^2$. The armatures L L' each consist of a centrally-pivoted bar, one end of which extends over the magnet and the other end of which extends outwardly and is slotted with the slot $L^3$, through which slot passes the end of a rod M, having at its lower end a pin $m$. The inner end of the armature is provided with an upwardly-projecting pin $L^4$, which, when the armature is raised or retracted from the magnet, lies in the path of the stop-arm $F^{11}$ of that train to which the magnet belongs. On the wheel $F^4$ of each of the trains is placed a pin $m'$, which at each revolution of said wheel comes into contact with the rod M and pushes it away far enough to disengage the pin $m$ from beneath the armature if said pin $m$ shall be in that position. When the pin $m'$ is not in contact with the rod M, and when at the same time the armature is drawn down toward the magnet, removing the pin $L^4$ from the path of the stop-arm $F^{11}$, then the said arm M is free to swing inward by its own weight and will bring the pin $m$ under the outer extension of the armature, and thus lock said armature in this position, and hold it locked until the gear-wheel $F^4$ shall have made a complete revolution and brought the pin $m'$ around into contact with the rod M to lift it away.

The pin $m'$ on the wheel $F^4$ is so placed on said wheel that when the pulley C' is in the position which sets the dampers or valves at the central or half-open position said pin $m'$ will come into contact with and lift away the rod M, releasing the armature from the locking-pin $m$, whereupon the retracting-spring $L^2$ will pull down the extension end of the armature and raise the inner end thereof, thus bringing the stop-pin $L^4$ into the path of the stop-arm $F^{11}$, and thus causing the train on that side to stop and to be stopped until it shall be released by a current sent through the magnet and operating to draw down the armature, and thus remove the pin $L^4$ from the path of the arm $F^{11}$. Of course when the dampers are fully opened or fully closed they can move no farther in these respective directions; but in order to prevent strain on the mechanism I provide a positive stop for the shaft D to govern its revolution in both directions. An arm D' is fixed to the shaft D and comes into contact with the stops $D^2$ $D^3$, $D^2$ being the stop corresponding to the fully-open position of the hot-air valve and the fully-closed position of the cold-air valve, while $D^3$ is the stop corresponding to the fully-closed position of the hot-air valve and the fully-open position of the cold-air valve.

Description will now be given of the thermostat and the electric circuits and their means of control by the thermostat and the movement of the mechanism and of how the circuit operates to govern the movement of the mechanism. The thermostat which it is preferred to employ is one of the kind having a blade or spring made of a strip of two different metals riveted together—for example, a strip of aluminium and a strip of steel. It is the well-known property of such a compound strip, composed of two metals of widely different expansibility under the action of heat, that the unequal expansion of the two metals will cause the compound blade to bend or bow in one direction as the temperature rises and to bend or bow in the other direction when the temperature falls. A peculiarity of the thermostat-blade in the present case consists in the fact that the free end of said blade is split into two parts or tails, one of which is made longer than the other, and further, that the two pairs of contact-points are provided, one pair for the short tail and one for the long tail of the blade. This construction of the blade and points will be seen indicated at Figs. 2 and 3 of the drawings. In the drawings N is the compound blade, $n$ is the long tail of the blade, and $n'$ is the short tail, while $70^a$ and 71 are the contact-points for the long tail, and 69 and $70^b$ are the contact-points for the short tail, of the blade. These figures 69, $70^a$, $70^b$, and 71 are employed to designate the four contact-points, because they correspond to the usual degrees of temperature to which the thermostat is set to form contact with them. Thus when the temperature in the room falls below 70° the blade bends in such manner that the short tail $n'$ comes in contact with 69, and the long tail $n$, by reason of the split, remains in contact with the point $70^a$; or, again, when the temperature now reaches to 70° the blade straightens, so that the short tail $n'$ comes in contact with the point $70^b$ and the long tail $n$ remains in contact with the point $70^a$; or, again, when the temperature now rises above 70° the short tail $n'$ remains in contact with the point $70^b$ and the long tail $n$ swings into contact with the point 71.

It may be generally stated that each of the several circuits is provided with two circuit breakers or changers, one actuated by changes in temperature, the thermostat, and the other by the trains which drive the shaft D.

The circuit-wires are connected to the points and to the blade as follows: The battery is shown at O. One terminal is connected to the wire $p'$ to the binding-post $p'$, and from this by the wire $p^2$ to the shaft D of the clockwork mechanism. This shaft D is furnished with three revolving contact-makers Q Q' $Q^2$, each of which is constructed to make contact at two points in the revolution. The contact-makers Q and Q' are electrically connected to the shaft D, but the contact-maker $Q^2$ is insulated from the shaft, being simply a wheel of insulating material carrying on its surface two strips of metal $q$ and $q'$, insulated from each other; and bearing upon this wheel are two spring-contact fingers $q^2$ $q^3$. The revolving contact-maker Q' has two contact-surfaces $Q^7$ $Q^8$ and a spring-contact finger $Q^9$. From the contact-finger $Q^9$ a wire $p^3$ is led to the magnet K' and from this magnet a wire $p^4$ is led to the binding-post $P^2$, and from this binding-post the wire $p^5$ is led to the thermostat connecting with the point $70^a$. From the contact-finger $q^6$ a wire $p^6$ leads to the magnet K, and from this magnet a wire $p^7$ leads to the binding-post $P^3$, and from thence a wire $p^8$ leads to the thermostat and is connected to the point $70^b$. From the contact-finger $q^2$ a wire $p^9$ leads to the binding-post $P^4$, and from thence a wire $p^{10}$ leads to the thermostat-blade N. From the spring-contact finger $q^3$ a wire $p^{11}$ leads to the binding-post $P^5$, and from this binding-post a wire $p^{12}$ leads to the point 69, and a wire $p^{13}$ leads from the contact-point 69 to the contact-point 71. From said binding-post $P^5$ a wire $p^{14}$ leads to the switch R, and from this switch a wire $p^{15}$ leads to the binding-post $P^6$, from which binding-post $P^6$ a wire $p^{16}$ leads to the other terminal of the battery.

For convenience of understanding the operation of these circuits it will be better to consider them separately in the different positions of the shaft D, and consequently of the hot-air valve, omitting the consideration of the cold-air valve to avoid confusion, remembering only that the cold-air valve is fully closed when the hot-air valve is fully opened, fully opened when the hot-air valve is fully closed, and half-way open when the hot-air valve is half-way open. In the diagram Fig. 9 the shaft D is shown in the position which it occupies when the hot-air valve is half-open, in which position it will be noticed that the contact-fingers $q^6$ and $Q^9$ are both in contact with the shaft D; and the train of clockwork on both sides of the machine may be supposed to be standing still. Now if we suppose, in this condition of affairs, that the temperature in the room falls and the thermostat-blade makes connection between the points 69 and $70^a$, then the circuit will be as follows: from the battery through wires $p'$ $p^2$ to shaft D, through shaft D and contact-maker Q' to contact-finger $Q^9$, from thence by wire $p^3$ to magnet K', thence by wires $p^4$ $p^5$ to the thermostat connecting at point $70^a$, thence through the blade of the thermostat to the point 69, thence by wires $p^{12}$ to switch R, thence by wires $p^{15}$ $p^{16}$ back to battery O. The circuit is thus sent through the magnet K', which, therefore, being energized, instantly attracts its armature and sets the train of clockwork on that side into operation by withdrawing the pin $L^4$ from the path of the stop-arm $F^{11}$, as above described, and the train of clockwork on this side being thus set in motion, the shaft D starts to rotate in the direction which opens the hot-air valve and continues to rotate until said hot-air valve is fully open, and when fully opened the mechanism of the train, as before explained, comes to a standstill. Now, being supposed to be in this condition, we will suppose, further, that the hot air which is being admitted raises the temperature of the room to 70°. Thereupon the thermostat-blade will straighten until the blade is in contact with the points $70^a$ and $70^b$, as indicated in the diagram Fig. 10, whereupon the current will be as follows: from the battery O by wires $p'$ $p^2$ to the shaft D, through the shaft D to the finger $q^6$, through wire $p^6$ to the magnet K, through the wires $p^7$ $p^8$ to the thermostat, connecting at the point $70^b$, through the blade of the thermostat, through the wire $p^{10}$ to the contact-finger $q^2$, thence to the contact-finger $q^3$, thence by wire $p^{11}$ to the binding-post $P^5$, thence by wire $p^{14}$ to the switch R, thence by wires $p^{15}$ and $p^{16}$ back to the battery O. This circuit it is seen has been through the magnet K, and has operated its armature to release the train of clockwork on that side which revolves the shaft D in such direction as to move the hot-air valve to the half-closed position, and when this half-closed position is attained the clockwork, as heretofore explained, comes to a stop, and this condition of affairs continues until a further change of temperature and a further change of position of the thermostat occur.

We will now suppose that while in the condition last described the temperature rises above 70°, so that the blade of the thermostat is brought into contact with the points $70^b$ and 71, as indicated in diagram Fig. 11. The current will now be from battery by wires $p'$ $p^2$ to the shaft D, to the contact-finger $q^6$, to the wire $p^6$, to magnet K, wire $p^7$, wire $p^8$ to point $70^b$, through the thermostat-blade to point 71, to wire $p^{13}$, to wire $p^{12}$, to wire $p^{14}$, to switch R, to wire $p^{15}$, to wire $p^{16}$, and back to battery. The result is that the magnet K is again energized and the train on that side again set in motion, which moves the hot-air damper again in the same direction until said damper is fully closed, which condition continues until the temperature changes by falling.

When the temperature falls to 70°, the thermostat-blade will again straighten out, as before illustrated in Fig. 10, until the blade is in contact with $70^a$ $70^b$, which condition is shown in Fig. 12 the same as in Fig. 10. But now the shaft D having assumed a different position, as indicated in the diagram Fig. 12, the current will be through magnet K' instead of through magnet K, as follows: from the battery to wire $p'$, to wire $p^2$, to shaft D, to contact-finger $Q^9$, to wire $p^3$, to magnet K', to wire $p^4$, to wire $p^5$, to the thermostat, making contact at point $70^a$, through the thermostat-blade to wire $p^{10}$, to contact-fingers $q^2 q^3$, to wire $p^{11}$, to wire $p^{14}$, to switch R, to wire $p^{15}$, to wire $p^{16}$, and back to the battery. The magnet K being energized, the train on that side is released and the valve moved until it is again in the central position, when the mechanism stops as before. These changes continue so long as changes occur in the temperature of the room sufficient to actuate the thermostat.

The wires $p^{17}$, one at each side of each of the diagrams Figs. 2, 9, 10, 11, and 12, are simply shunts, each including a resistance-coil $p^{18}$, and are merely for the purpose of producing a high-resistance shunt around the contact-fingers $q^6$ and $Q^9$ to mitigate sparking.

The purpose of the switch R is to cut the battery out when desired; and as it is always desirable in order to save its strength to cut the battery out when the clockwork is run down, the switch is made automatic for this purpose by connecting from each of the clock-weights $e'$ to the switch a cord or chain S, of such length that when either or both of the weights has reached nearly its lowest point the cord or chain S will be pulled tight and the switch pulled down by a slight farther descent of the weight or weights.

The following is the subject-matter claimed:

1. The regulator for heating apparatus, consisting of the following elements combined together and related to each other substantially as specified: first the valve or damper; second the two trains of clockwork connected to a common shaft and adapted to turn said shaft in opposite directions and through said shaft connected to the valve or damper; third two electromagnets one for each train and operating a detent of the train; fourth the thermostat for controlling the operation of the mechanism through the medium of the electric circuits; and fifth a battery and electric circuits, all substantially as specified.

2. The thermostat having a split blade with a long and short tail, and four contact-points two for the long tail and two for the short tail, substantially as specified.

3. The thermostat having a split blade with a long and short tail and four contact-points, two for the long tail and two for the short tail, in combination with the shaft D connected to the valve or damper, two trains of clockwork geared to said shaft for revolving it in opposite directions and adapted to turn said shaft such distance at one time as shall move the damper through half its arc, an electromagnet and armature for each of said trains adapted to release the train when the magnet is operated, and the electric circuits controlled by the thermostat and by moving contacts mounted on said shaft D, substantially as specified.

HARLEIGH GILLETTE.

Witnesses:
H. M. MUNDAY,
LEW. E. CURTIS.